United States Patent Office 3,445,419
Patented May 20, 1969

3,445,419
ROOM TEMPERATURE VULCANIZABLE
SILICONES
William Vanderlinde, Midland, Mich., assignor to Dow
Corning Corporation, Midland, Mich., a corporation of
Michigan
No Drawing. Filed Jan. 21, 1966, Ser. No. 522,075
Int. Cl. C08g *31/22, 47/06*
U.S. Cl. 260—37                                   19 Claims

ABSTRACT OF THE DISCLOSURE

A cured composition which is the reaction product of a vinyl terminated organopolysiloxane and an ester of an organic polyol and an acid of the formula HOOCR″SH where R″ is a divalent alkyl radical is disclosed. Also disclosed are compositions of the formula

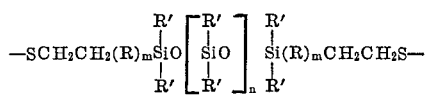

where the sulfur atom is a sulfur atom of at least one ester described above, R is a divalent alkyl radical, R' is a monovalent hydrocarbon or halohydrocarbon radical, m is 0 or 1 and n is over 50. The above compositions cure to resins and elastomers when exposed to air in the presence of alkali but are stable in the absence of air.

---

This application relates to new organosilicon compositions which are vulcanizable at room temperature through the use of esters of mercaptocarboxylic acids and polyhydric alcohols.

The curable compositions of this invention consists essentially of (a) one molar part of an organopolysiloxane of the average formula

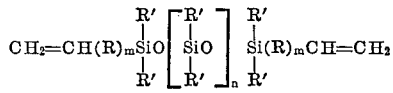

where R is a divalent alkyl radical, R' is selected from the group consisting of monovalent hydrocarbon and halohydrocarbon radicals, m has a value of 0 to 1, and n has an average value of over 50, and preferably over 100, and (b) from 0.4 to 4 molar parts of at least one ester of an organic polyol and an acid of the formula HOOCR″SH where R″ is a divalent alkyl radical, said ester containing an average of at least 2.0 —SH groups per molecule, and there being at least 2.0 molar parts of —SH groups present, and (c) from 0 to 100 weight percent, based on the weight of (a) and (b), of a filler.

Both one and two component room-temperature or low-temperature vulcanizing elastomers which have superior physical properties can be made from these compositions.

R' can be any monovalent hydrocarbon radical, such as methyl, ethyl, propyl, 2-ethylhexyl, octadecyl, myricyl, cyclohexyl, vinyl, allyl, cyclopentenyl, phenyl, tolyl, xenyl, or 2-phenylpropyl. R' can also be any monovalent halohydrocrabon radical such as 3,3,3-trifluoropropyl, 1,1,2,2-tetrahydroperfluorooctyl, 6,8-dibromooctyl, chlorocyclopentyl, fluoroallyl, dibromophenyl, α,α,α-trifluorotolyl, and iodoxenyl. It is often preferable for R' to be free of aliphatic unsaturation. R' is most preferably methyl, and m is preferably 0.

R and R″ can each be any divalent alkyl redical, e.g.

methylene, dimethylene, hexamethylene, octadecamethylene,

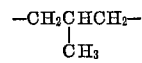

or

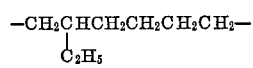

Ingredient (b), therefore, can be an ester of any acid such as 2-mercaptoacetic acid, 3-mercaptopropionic acid,

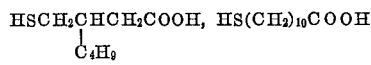

and

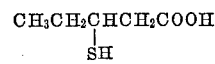

and any polyol such as propylene glycol, poly(ethylene glycol), trimethylol propane, glycerine, sugar, pinacol, cyclohexane triol, 2,4,6-decane triol, hydroquinone, cellulose, polyvinyl alcohol, 2,2'-dichloropropylene glycol, 1,3,5-benzene triol, and

The term "organic polyol" is meant to include any organic compound which possesses at least two ≡COH groups which are each no more acidic than the hydroxyl group of phenol.

The esters which are used as ingredient (b) can be made by methods which are well-known to those skilled in the art. Typically, they can be made by reaction of one of the above-described mercapto-substituted organic acids or an anhydride thereof with an organic polyol at temperatures of about 100° C. in the presence of a small amount of sulfuric acid as a catalyst.

The composition of this invention is believed to cure at least in part by the reaction of the mercaptan groups of (b) with the aliphatically unsaturated linkages of (a) in the following manner:

(I)
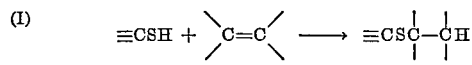

which can result in copolymerization between (a) and (b), forming a cured elastomer.

This reaction may or may not be spontaneous. If it is not, it can be initiated and accelerated by heat and by free-radical catalysts such as the organic peroxides, e.g. dibenzoyl peroxide, ditertiarybutyl peroxide, dichlorobenzoyl peroxide, and dicumyl peroxide, or by radiation such as ultraviolet light, X-rays, or gamma-rays.

The reaction is generally fast when R″ is methylene and m is 0. The rate of the reaction is dependent in an inverse manner on the number of carbon atoms which separate the mercaptan group and the carboxyl group of (b).

When there are at least 1.8 molar parts of ingredient (b) present for every one molar part of ingredient (a), where R' is free of aliphatic unsaturation, only a minor amount of crosslinking will take place by reaction (I) above; instead most of the terminally unsaturated groups of (a) will be consumed each by a separate molecule of (b), resulting in a mercaptan-ended silicone composition having a molecular weight which is not greatly higher than that of the original, unreacted composition.

Under these circumstances, a second curing reaction takes place in the presence of a catalytic amount of an alkali catalyst and oxygen:

(II)
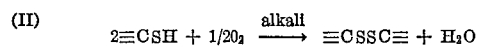

Therefore, on exposure to the air the above-described compositions are curable to elastomers and resins, often without heating, while they do not cure at room temperature when kept from the air.

When some of the R' groups contain aliphatic unsaturation, additional ingredient (b) must be added in order to render the composition air-vulcanizing, as an approximate balance in the moles of aliphatic unsaturation and crosslinker present is needed in order to obtain that property.

Any alkali is suitable as a curing catalyst, e.g. sodium hydroxide, calcium hydroxide, potassium dimethylsilanolate, potassium acetate, sodium carbonate, n-butylcesium, triethylphosphene, and rubidium borate. The preferred alkali catalysts are the amine-type compounds, e.g. ammonia, ammonium hydroxide, ammonium carbonate; amines such as aniline, isopropylamine, t-butylamine, n-hexylamine, dodecylamine, dibutylamine, phenylmethylamine, trimethylamine, tributylamine, trihexylamine, pyridine, ethylenediamine, ethanolamine, urea, propylene imine, and quaternary ammonium compounds such as tetraphenyl ammonium acetate, tetramethylammonium hydroxide, and tetrabutyl ammonium hydroxide.

By "alkali" it is meant that a 0.1 molar dispersion of the compound in distilled water has a pH greater than 8, although it is preferred to use those compositions as alkaline catalysts which exhibit a pH of at least 10 under those conditions. However, "alkali" can also be those weakly acidic or neutral compounds which yield an alkali on decomposition, e.g. ammonium acetate.

The amount of alkali catalyst present is generally not critical since its presence merely affects the rate of reaction, but generally from 0.05 to 3 weight percent, based on the weight of ingredients (a) and (b), is used. Large amounts of alkali metal hydroxides do, however, appear to inhibit the curing reaction somewhat, and other alkaline catalysts are therefore generally used.

The compositions of this invention can be prepared using a solvent as a dispersing agent, if desired, without departing from the scope of the claims of this application. Preferably, any volatile solvent which is nonreactive to the reactants or products used herein can be used: e.g. hexane, cyclohexane, isooctane, benzene, toluene, diethylether, dibutylether, diethyleneglycoldimethylether, tetrahydrofuran, 1,1,1-trichloroethane, and trifluorotrichloroethane.

Examples of fillers which can be present in the compositions of this invention are finely powdered silica or carbon, glass fibers, crushed quartz, alumina, titania, feldspar, powdered aluminum or copper, and clay.

The following examples are illustrative only and should not be construed as limiting the invention, which is properly delineated in the appended claims.

EXAMPLE 1

Into a 5 liter flask fitted with a reflux condenser and mechanical stirrer there was placed 1864 g. (1 molar part) of an organopolysiloxane of the average formula $$CH_2=CH\overset{CH_3}{\underset{\phi}{Si}}O\left[\overset{CH_3}{\underset{CH_3}{\underset{|}{Si}O}}\right]_{\sim 250}\overset{CH_3}{\underset{\phi}{Si}}CH=CH_2$$

1000 ml. of toluene, 97.6 g. (2 molar parts) of pentaerythritol tetrakis(3-mercaptopropionate), and 4 g. of ditertiarybutyl peroxide.

This mixture was refluxed for two hours, and the toluene removed by distillation. The product was essentially the above silicone polymer which had a molecule of the above pentaerythritol ester grafter to each vinyl group by means of reaction (I) described above.

One hundred parts by weight of this product were milled with 30 parts of powdered silica filler. The composition was deaerated by placing it in a vacuum, and one part of morpholine $$(O\underset{CH_2CH_2}{\overset{CH_2CH_2}{\diagup\diagdown}}NH)$$

was added with intimate mixing to serve as a curing catalyst.

This pasty mixture was then exposed to the air at room temperature. It cured to an elastomer apparently by means of reaction (II) above.

The properties of the elastomer improved on continued exposure to the air, as is shown below:

|  | After 3 days in air | After 10 days in air |
| --- | --- | --- |
| Tensile strength at break (p.s.i.) | 420 | 800 |
| Elongation at break (percent) | 260 | 220 |
| Tension set (percent) | 2 | 0 |
| Die "B" tear strength (lb.) | 30 | ~100 |
| Shore "A" durometer | 40 | 42 |

EXAMPLE 2

Into a flask there was placed 35.6 g. (0.1 mole) of $CH_3CH_2C(CH_2OOCCH_2SH)_3$, 1000 ml. of toluene, and 1300 g. (0.05 mole) of an organopolysiloxane of the following average formula:

$$CH_2=CH\overset{CH_3}{\underset{\phi}{Si}}O\left[\overset{CH_3}{\underset{CH_3}{\underset{|}{Si}O}}\right]_{\sim 350}\overset{CH_3}{\underset{\phi}{Si}}CH=CH_2$$

This mixture was brought to reflux, and 2 g. of ditertiary butyl peroxide were added.

The reflux was continued for 3 hours, and the toluene was stripped from the mixture to yield a gummy reaction product of the above silicone and mercaptoacetate ester.

One hundred parts by weight of this reaction product were milled with 30 parts of powdered silica filler and one part of morpholine, and exposed to the air.

The composition cured to an elastomer in 24 hours. After 10 days of exposure to the air, the product had the following properties:

| | |
| --- | --- |
| Durometer (Shore A) | 31 |
| Tensile strength (p.s.i.) | 360 |
| Elongation (percent) | 460 |
| Tension set (percent) | 2 |
| Die "B" Tear (lb.) | 42 |

EXAMPLE 3

Fifteen g. of (a) the reaction product of the silicone polymer and the pentaerythritol ester of Example 1 were mixed with 10 g. of (b) an organopolysiloxane having about 100 silicon atoms per molecule consisting of 97 mol percent of dimethylsiloxane units, 1 mol percent of methylvinylsiloxane units, and 2 mole percent of dimethylvinylsiloxane units. To this there was also added a small amount of t-butylperoxy pivalate catalyst dissolved in hexane.

On heating at 90° C. the composition formed an insoluble gel, which was the cured reaction product of (a) and (b).

EXAMPLE 4

(A) To 0.1 mole of ethylene glycol bis-2-mercaptoacetate dissolved in 1000 ml. of toluene, there was slowly added 0.05 mole of the vinyl-endblocked organopolysiloxane ingredient of Example 2 and about 2 g. of ditertiarybutyl peroxide.

The mixture was then refluxed for two hours and stripped to 150° C. at a pressure of about 1 mm. to yield a reaction product of the organopolysiloxane and the ethylene glycol ester which contained an average of two mercaptan groups per molecule.

(B) To a mixture of 0.1 mole of pentaerythritol-tetrakis-2-mercaptoacetate, about 2 g. of ditertiarybutyl peroxide, and 1000 g. of toluene there was slowly added, over a two hour period, 0.05 mole of

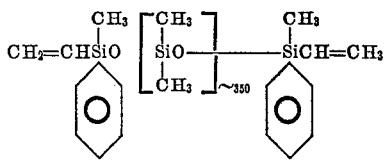

This was refluxed for about four hours, and then vacuum-stripped to 150° C. A viscous reaction product of the silicone and the mercaptoacetate ester was recovered.

(C) A mixture was prepared from 50 parts by weight of each of the products of (A) and (B) above, 30 parts of a hydrophobic silica filler, and 1 part of hexamethyldisilazane as a curing catalyst.

After milling, samples of the plastic mixture were allowed to stand in the air.

After standing for the time listed below, the samples had cured to elastomers having the following physical properties:

|  | 3 days | 10 days |
| --- | --- | --- |
| Shore "A" durometer | 26 | 28 |
| Tensile (p.s.i.) | 390 | 560 |
| Elongation (percent) | 600 | 580 |
| Die "B" tear (lb.) | 38 | 52 |
| Tension set (percent) | (¹) | 1 |

¹ Not measured.

EXAMPLE 5

When 0.1 mole of

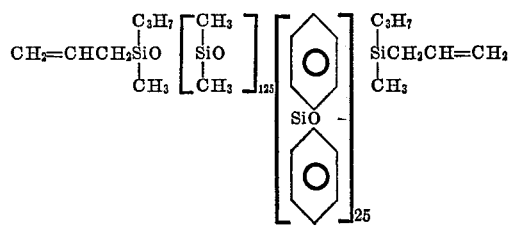

is added with vigorous stirring to 0.07 mole of glycerine-tris-2-mercaptoaectate, a cured elastomeric material forms on standing at room temperature in a closed vessel.

EXAMPLE 6

When 0.1 mole of

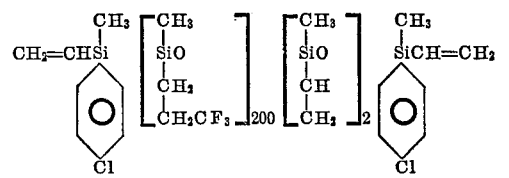

is added with vigorous stirring to 0.4 mole of phloroglucinol-tris-4-mercaptobutyrate, gentle heating at 70° C. causes the formation of a viscous reaction product of the above two ingredients which cures to a rubbery gel upon exposure to the air in the presence of ammonia.

That which is claimed is:

1. A cured composition consisting essentially of the reaction product of
   (a) one molar part of an organopolysiloxane of the average formula

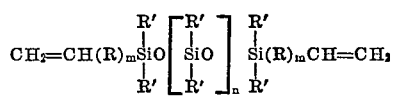

where R is a divalent alkyl radical, R' is selected from the group consisting of monovalent hydrocarbon and halohydrocarbon radicals, m has a value of 0 to 1, and n has an average value of over 50, and (b) from 0.4 to 1.8 molar parts of at least one ester of an organic polyol and an acid of the formula HOOCR″SH where R″ is a divalent alkyl radical, said ester containing an average of at least 2.0 —SH groups per molecule, and there being at least 2.0 molar parts of —SH groups present.

2. The cured composition of claim 1 in which a filler is present in amounts up to 100 weight percent based on the weight of (a) and (b).

3. The cured composition of claim 1 in which R' is methyl.

4. The cured composition of claim 1 in which m is 0.

5. A composition consisting essentially of

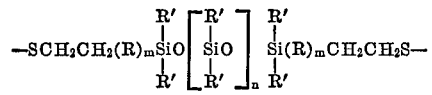

where the sulfur atom is a sulfur atom of at least one ester of an organic polyol and an acid of the formula

HOOCR″SH where R″ is a divalent alkyl radical, said ester containing an average of at least 2.0 —SH groups per molecule, and there being at least 2.0 molar parts of —SH groups present, and where R is a divalent alkyl radical, R' is selected from the group consisting of monovalent hydrocarbon and halohydrocarbon radicals, m has a value of 0 to 1 and n has an average value over 50.

6. The composition of claim 5 in which a catalytic amount of an alkali is present, said composition being stable in the absence of air but cures upon exposure to air.

7. The composition of claim 5 in which an organic peroxide and an organopolysiloxane of the average formula

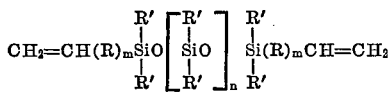

where R, R', m and n are defined in claim 5 are present.

8. The composition of claim 5 in which the formula is

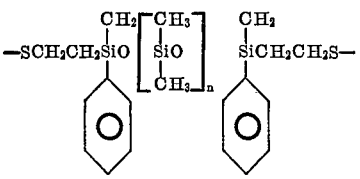

where n has an average value of over 100.

9. The composition of claim 8 in which a catalytic amount of an alkali is present, said composition being stable in the absence of air but cures upon exposure to air.

10. The composition in accordance with claim 5 in which R″ is methylene and m is 0.

11. The composition in accordance with claim 6 in which R″ is methylene and m is 0.

12. The composition in accordance with claim 7 in which R″ is methylene and m is 0.

13. The composition in accordance with claim 8 in which R″ is methylene.

14. The composition in accordance with claim 9 in which R″ is methylene.

15. The composition in accordance with claim 5 in which HOOCR″SH is 3-mercaptopropionic acid.

16. The composition in accordance with claim 9 in which HOOCR″SH is 3-mercaptopropionic acid.

17. The composition in accordance with claim 5 in which the polyol is pentaerythritol.

18. The composition in accordance with claim 9 in which the polyol is pentaerythritol.

19. The composition in accordance with claim 14 in which the polyol is pentaerythritol.

References Cited

UNITED STATES PATENTS

| | | | |
|---|---|---|---|
| 2,411,954 | 12/1946 | Burke | 260—481 |
| 2,461,920 | 2/1949 | Pratt | 260—481 |
| 2,515,857 | 7/1950 | Burke et al. | 260—46.5 |
| 3,192,181 | 6/1965 | Moore | 260—37 |

OTHER REFERENCES

K. E. Polmanteer and R. J. Koch, Ind. & Eng. Chem., January 1957, pp. 49–54.

MORRIS LIEBMAN, *Primary Examiner.*

L. T. JACOBS, *Assistant Examiner.*

U.S. Cl. X.R.

260—46.5